July 14, 1925.
A. BISSIRI
1,546,193
LIVE PICTURE PRODUCTION
Filed Aug. 7, 1922
2 Sheets-Sheet 1
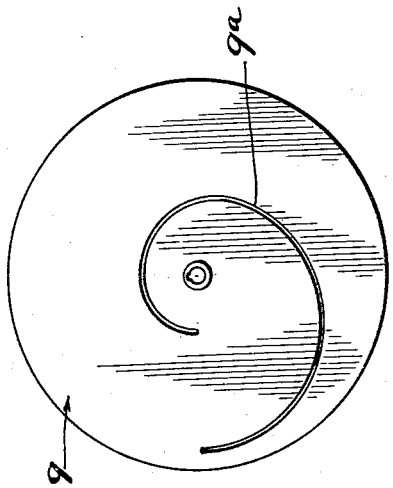
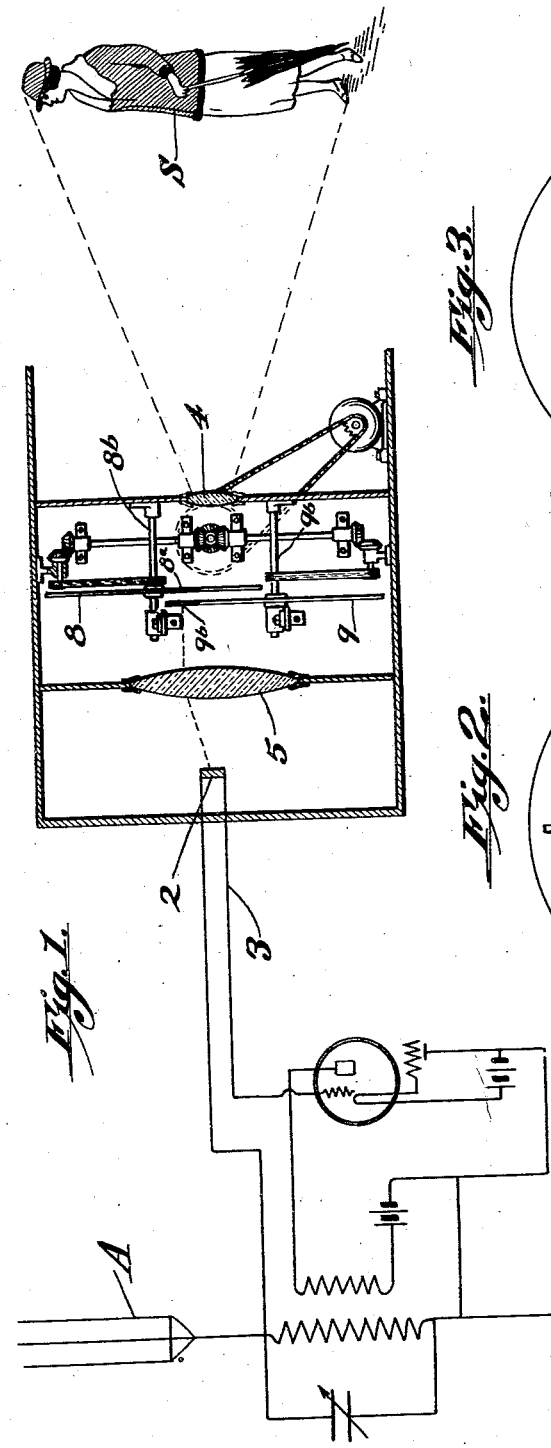
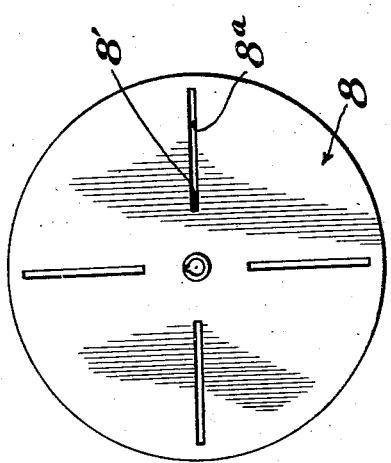
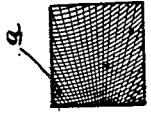
Inventor
Augusto Bissiri
By Hazard and Miller
Attorneys

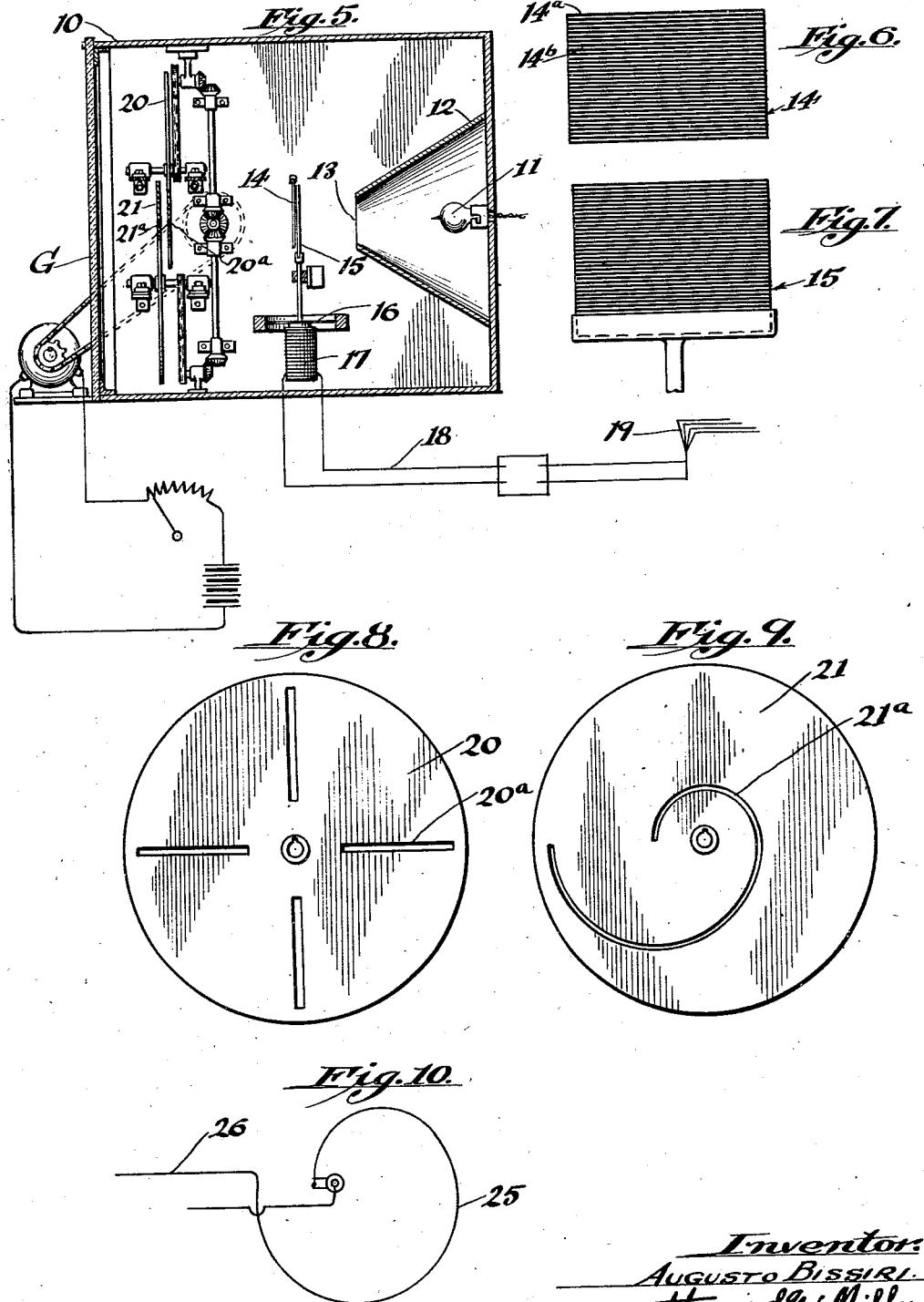

Patented July 14, 1925.

1,546,193

UNITED STATES PATENT OFFICE.

AUGUSTO BISSIRI, OF LOS ANGELES, CALIFORNIA.

LIVE-PICTURE PRODUCTION.

Application filed August 7, 1922. Serial No. 580,119.

*To all whom it may concern:*

Be it known that I, AUGUSTO BISSIRI, a citizen of the United States, residing at Los Angeles, in the county of Los Angeles and State of California, have invented new and useful Improvements in Live-Picture Production, of which the following is a specification.

This invention relates to electrical apparatus and has for its object to provide a method and apparatus for the projection of live or motion pictures.

An object of the invention is to provide an apparatus and method whereby picture reproductions of animate and inanimate scenes and objects can be broadcasted by so-called wireless telegraph apparatus and received by the same.

A broad object of the invention is to provide means whereby a transmitting electrical current is controlled and varied by the degree of light which is imposed upon an element of the transmitting apparatus, and to provide means for receiving a transmitted wave and which means is operated by the transmitted and varying wave so as to control and regulate automatically and constantly the intensity of a beam or zone of light transmitted to a receiving screen. Another object is to provide means for controlling a beam of light coming from the original subject in such manner that owing to the phenomenon of persistence of vision in the human eye the beam of light is subdivided into a large number of small zones, each successively rendered effective upon a light sensitive medium which is introduced in a transmitting circuit of a wireless apparatus, means also being provided which may be coordinated with the transmitting and light controlling apparatus so that a received and varying wave strength may be utilized to regulate the intensity of a beam of light from a source passing through a screen or ground glass so that the controlled light at the receiving station will produce upon the ground glass in a given interval of time an image which can be received by the eye, enabling the clear perception by the eye of the reproduced picture on the screen or ground glass of the receiving apparatus.

Other objects and advantages will be made manifest in the following specification of an embodiment of the invention illustrated in the accompanying drawings, wherein Figure 1 is a diagrammatic view of a transmitting portion of the apparatus;

Figure 2 is a plan of a type of light shutter;

Figure 3 is a plan view of an element controlling the passage of light;

Figure 4 is a plan view illustrating graphically the effect of the cooperation of the light controlling members of the sending apparatus of Figure 1;

Figure 5 is a vertical section and diagrammatic view of a receiving apparatus;

Figures 6 and 7 are views of fragments of coordinate screens of the receiving apparatus;

Figure 8 is a plan of a light shutter of the receiving apparatus;

Figure 9 is a plan of a coordinate light shutter of the receiving apparatus;

Figure 10 is a plan showing a light sensitive filament.

The broad principle of the present invention resides in controlling a transmitting wireless or broadcasting current wholly by a variable beam of light, this beam coming from a source such, for instance, as is reflected from an animate or inanimate scene or object. That is to say, if in an entire scene the whole scene be subdivided into any suitable number of divisions or sections, it is, of course, clear that the amount of light coming from any one section of the whole scene may be the same as or may be different from the amount of light coming from another section. Obviously, all scenes are readily divisible because of differences in the amount of light in the different portions thereof and the amount of light at each portion of a scene is by my invention utilized to control and vary or regulate the intensity of the current which is transmitted to a broadcasting apparatus such as is diagrammatically shown in Figure 1, and includes an antenna A. It will be assumed that it is desired to broadcast a scene such, for instance, as the figure of a lady, as indicated at S. A transmitting camera is, therefore, properly focused upon the object and this camera is provided with means for subdividing the entire scene into a number of sections of any suitable size, the camera being provided with a light sensitive device of any appropriate kind which is indicated at 2. This light sensitive device is introduced as in the circuit 3 of the wireless transmitting apparatus diagrammatically shown so that according to the intensity of the beam of light striking the light sensitive medium 2 the current in the circuit 3 will be varied and regulated. The light sensitive medium 2 may be a selenium cell or some other means, as, for instance, a photo-electric cell.

The camera includes the usual objective lens 4 through which the image passes to and impinges upon the sensitive medium 2. If desired, there may be interposed between the lens 4 and the medium 2 an intermediate lens 5 constructed and arranged to focus all of the beams, considering that each beam can be individually selected, or considering that each beam represents a small fraction of the entire area of the scene being photographed, upon the sensitive medium 2. This enables a sensitive medium of comparatively small area to be utilized and, therefore, enables the use of a medium which is highly sensitive to the impinging beam and which will readily control the imposed current in the circuit 3.

Means are provided for progressively permitting the passage of light from small subdivisions or areas of the objective in the field of the lens 4 so that only a very small fraction of the whole area of the scene or field is being transmitted in a given instant of time, the whole area of the field being transmitted, however, in light rays in a given period of time. The phenomenon of persistence of vision is depended upon to enable the impression upon the eye of the observer of a reproduced image from the original and, therefore, the light controlling means in the transmitting camera is so operated that the entire zone of the scene is covered in one action, which preferably does not require more than one-sixteenth of a second with the result that while in a given instant only a small fraction of the whole area of the scene is being utilized to control the current by means of the light receiving medium 2, the human eye will receive in the requisite time an image visualizing the whole scene.

The light controlling means, therefore, includes devices so operative as to cut up the whole scene into the desired number of fragments, each of which has its own light value or light unit effect and each light value is successively impressed on the light sensitive medium 2.

One form of the scene subdividing means is here shown as including a pair of coordinate shutter members 8 and 9. These members are of opaque material and are interposed between the camera lens 4 and the light receiving medium 2. The members are so associated and so constructed and arranged that they cooperate to permit the passage of only a small area of the reflected light from the whole scene. For instance, the shutter 8 may be provided with one or more comparatively narrow slots $8^a$ and these are shown in this embodiment as disposed radially to the center of the shutter and upon or about which center the shutter member is rotatably mounted in any suitable manner, as on a shaft $8^b$ in the camera. The coordinate shutter 9 is likewise rotatably mounted on a shaft $9^b$ and is arranged in parallel and slightly offset relation to the shutter 8 so that these will have overlapping contiguous portions as seen in Figure 1. The shutter 9 is provided with a light transmitting slot or aperture or window $9^b$ which is here shown as of spiral form, the pitch between the coils of which is about equal to the length of each of the slots $8^a$ in the shutter member 8. Therefore, as is shown in Figure 4, when the shutters 8 and 9 are rotated at suitable speed, it will be seen that the leading end of the window $9^a$ may be registered at the spot $a$, Figure 4, with the inner end 8′ of a slot $8^a$ in the shutter 8, and as these two apertures overlap, it will be clear that only a pin-like ray of light will pass through the coordinating shutters from the objective or scene S and such a pin-like ray may be considered as emanating from the spot $s$, Figure 1. During one rotation of the spiral shutter 9 it will be clear that the spiral window will advance from the end 8′ of a slot $8^a$ outwardly with respect to the slot while at the same time the window $8^a$ will be making an arcuate movement as from the top to the bottom of the zone, Figure 4. The shutter 9 will be rotated at such speed that it will cross each window $8^a$ a suitable number of times so that the light being reflected from the scene S will be permitted to pass in successive pin-like rays through the shutter members and in such order and sequence that the whole area of the scene S will be projected through the shutter.

For example, it may be desired to provide the shutter 8 with one hundred windows $8^a$, and in such case if the shutter 8 is revolved at the same rate of speed that the shutter 9 is rotated, for instance, at a ratio of one to one, then the one hundred windows $8^a$ will have swept across the contiguous side of the shutter 9 while the spiral window $9^a$ is making one cycle.

Each small fraction of the area of the scene S will, therefore, project its pin-like ray through the coordinated shutters 8 and 9, and this ray will impinge upon the light receiving and sensitive medium 2 and the function of this will be to increase or decrease resistance to the flow of current in the circuit 3 and this variable current will, in the now well-known manner, be imposed upon the antenna A and the electrical waves in varying force projected therefrom.

A receiving apparatus of the invention is of a kind capable of receiving the varying waves transmitted by the sending antenna and includes means for generating light which, in turn, is projected upon a screen or ground glass whereon the intercepted rays will produce an image corresponding in degree of light to the light received from the objective scene.

The receiving apparatus is shown as including in this embodiment a suitable dark chamber 10 having a source of light 11, preferably enclosed in a shield 12 having an outlet aperture 13 for a beam of light. In front of this beam and between the source of light 11 and a screen or ground glass G is arranged means for regulating the volume of light from the guard 12 and also means are used which may be coordinated with the light controlling shutters 8 and 9 of the sending apparatus.

The light regulating means may consist of a set of batteries which may conveniently consist of plates 14 and 15, one of which may be mounted stationarily at the window 13 and the other of which is movably mounted and is connected to an actuating element such as a diaphragm 16 magnetically controlled by a magnet 17 which is energized by a current received in a receiving circuit 18 upon wireless receiving apparatus generally indicated at 19 and which functions to receive the waves from the transmitting antenna A, these waves finally being imposed upon the circuit 18 of the receiving apparatus and, therefore, utilized to actuate the diaphragm 16. The screen plates 14 and 15 are provided with transparent and opaque portions, as represented by the dark lines 14$^a$ and the clear spaces 14$^b$, these obviously being suitably proportioned and preferably of equal transverse dimension. The plate 15 is correspondingly provided with clear spaced and opaque bars, so that when these two members are shifted the clear spaces may be registered and thus permit the transmission of light rays from the window 13 to the screen or ground glass G, and when the members are relatively shifted so that the bars of one cover the clear spaces of the other, all the light will be intercepted and obviously the amount of light will be regulated and varied according to the degree of uncovering or opening of the transparent portions of the coordinate members 14 and 15.

By connecting the movable light screen 15 to the diaphragm 16 it will be seen that the oscillations of the diaphragm, determined by the strength of the received current in the circuit 18, will reciprocate the light screen 15 as to the stationary screen 14 and constantly vary the degree of light passing from the window 13 to the ground glass.

This operation would result in the passage of a generally diffused volume of light coming from the window 13, the volume fluctuating according to the strength of the current received in the magnet 17. To obtain a definite image corresponding to the master scene S, means are employed to cut up the volume or beam of light coming through the automatically acting light controlling means 14—15 so that pin-like rays only will pass to the ground glass or screen G.

Such cutting up means are shown in Figures 8 and 9 as consisting of light regulatures 8 and 9 as consisting of light regulating shutters 20 and 21 generally similar to the above mentioned shutters 8 and 9. These shutters are arranged in the dark chamber 10 contiguous to the screen G and are coordinated with each other so as to progressively pass pin-like rays from the screen parts 14 and 15 to the ground glass G. The shutter 20 is shown as provided with a suitable number of slots 20$^a$ and the shutter 21 is provided with a spiral slot or window 21$^a$ similar to the devices above described.

Thus if the shutters 20—21 of the receiving apparatus be coordinated by simple selection and control of their speed in operation with the motion and time of the shutters 8 and 9 of the transmitter, it will be seen that an amount of light properly proportioned to the light at the transmitter will be impinged upon the screen or ground glass G of the receiver, and owing to the persistence of vision in the human eye the fractions of area of the ground glass will be so rapidly illuminated as to enable the eye to receive the impression of the image cast from the original scene.

It is to be understood that the broad principle involved in the projection of an image on a receiving screen by an apparatus which operates to select in progressive fashion a myriad of zones in a given scene and by which apparatus an electrical current is controlled by the intensity of the light at each of the zones, the fluctuation of the transmitting current being utilized to control a receiving circuit which will operate means to fluctuate a beam of light and which beam of light is intercepted by means which may be coordinated with the transmitting selecting means so that a screen can be illuminated in successive zones with degrees of light evaluated according to corresponding zones in the area from the original scene.

Instead of the collecting lens 5 and of the sensitive medium 2 of the transmitting apparatus as shown in Figure 1, there may be utilized a light sensitive spiral as shown in Figure 10. This spiral designated at 25 may be used in place of the shutter 9 having the spiral window 9ª, so that when light coming from the object through the lens 4 and passing through the windows 8ª of the shutter 8 would fall upon the spiral 25 this itself would vary the current transmitted to the transmitting circuit of the apparatus in accordance with the volume of light impinging upon the sensitive spiral element or filament 25.

Further embodiments, modifications and variations may be resorted to within the spirit of the invention as here claimed.

What is claimed is:

1. In a system for the transmission of pictures, a pair of light controlling screens, each having transparent and opaque portions, a constant source of light falling upon said screens in a direction transversely to said screens, a source of electric oscillations having means operatively connected to said screens to shift them relatively to one another to vary the intensity of the light passing therefrom.

2. In a system for the transmission of pictures, a stationary light controlling screen and a movable light controlling screen, each screen having transparent and opaque portions, a constant source of light falling upon said screens in a direction transversely therethrough, a source of electric oscillations having means operatively connected to said movable screen to move the same relatively to the stationary screen to vary the intensity of the light passing from said screens.

3. In a system for the transmission of pictures, a stationary light controlling screen and a movable light controlling screen disposed parallel thereto, each having parallel, transparent and opaque portions arranged that the light passing therethrough may have any value from the maximum amount to zero, a constant source of light falling upon said screens in a direction transversely thereto, and a source of electric oscillations having means operatively connected to said movable screen to shift the same in relation to the other screen to vary the intensity of the light passing therefrom.

In testimony whereof I have signed my name to this specification.

AUGUSTO BISSIRI.